United States Patent
Yang

(10) Patent No.: US 7,778,277 B2
(45) Date of Patent: Aug. 17, 2010

(54) TIMING RECOVERY METHOD AND SYSTEM THEREOF

(75) Inventor: Chih-Chieh Yang, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 422 days.

(21) Appl. No.: 11/556,187

(22) Filed: Nov. 3, 2006

(65) Prior Publication Data

US 2008/0126825 A1    May 29, 2008

(51) Int. Cl.
*H04J 3/24* (2006.01)
(52) U.S. Cl. .......... 370/474; 370/516; 386/111; 375/371
(58) Field of Classification Search .......... 370/474, 370/395.52, 506, 516, 519; 386/111; 375/371
See application file for complete search history.

(56) References Cited

U.S. PATENT DOCUMENTS 6,973,258 B1 * 12/2005 Yoo et al. .......... 386/111
7,069,574 B1 * 6/2006 Adams et al. .......... 725/68
2003/0058890 A1 * 3/2003 Ritchie et al. .......... 370/486
2005/0002402 A1 * 1/2005 Fairman .......... 370/395.5
2005/0259754 A1 * 11/2005 Ho et al. .......... 375/240.28
2006/0129727 A1 * 6/2006 Park .......... 710/107

OTHER PUBLICATIONS

Tryfonas et. al., "Timestamping Schemes for MPEG-2 Systems Layer and Their Effect on Receiver Clock Recovery.", IEEE 1999, pp. 251-263.*

\* cited by examiner

*Primary Examiner*—Jayanti K Patel
*Assistant Examiner*—Jung Park
(74) *Attorney, Agent, or Firm*—Winston Hsu

(57) ABSTRACT

A timing recovery method includes receiving a plurality of data packets via a transmission channel, wherein at least a data packet is attached with a timestamp generated according to a channel clock of the transmission channel at a source end; calculating a compensation value according to the timestamp and a channel timer value upon receipt of the data packet, wherein the channel timer value is generated by the channel clock of the transmission channel at a destination end; and utilizing the calculated compensation value to adjust processing timing of the received data packets.

30 Claims, 6 Drawing Sheets

TIMING RECOVERY METHOD AND SYSTEM THEREOF

BACKGROUND

The present invention relates to timing recovery, and more particularly, to timing recovery methods and systems for a received data stream carrying data packets.

In digital data transmission technology, timestamps are fundamental as to controlling timing of the digital data, especially in real-time audio/video systems. For example, the Moving Picture Experts Group (MPEG) standard utilizes timestamps called program clock references (PCRs) to achieve audio/video synchronization between a source end and a destination end. Specifically speaking, in the MPEG-2 standard, at least one program clock reference (PCR), i.e. a timestamp, per 100 milliseconds is inserted into a data stream carrying data packets to ensure that the original timing of the data packets can be preserved at the destination end.

At the source end, PCR values are typically generated and thus incremented with a standard clock rate of 27 MHz complying with the MPEG-2 standard. Specifically, a PCR value is determined as a count number generated by a local clock of the source end having frequency of 27 MHz at the timing when the data packet corresponding to the PCR is being output from the source end. When the data stream carrying data packets output from the source end is transmitted to the destination end, the PCRs can be extracted as a means to recover timing of the data stream. Specifically speaking, the PCR values are utilized to adjust a local clock of the destination end, where the data stream are processed, such as decoded, demultiplexed, transmitted, etc, according to the adjusted local clock, thereby achieving clock synchronization between the source end and the destination end. In some implementations, the PCR values are utilized to adjust the throughput of receiving end modules, such as the video and/or audio output throughput. A simple and well-known synchronization technique is to compute a difference value between the PCR values and the counted number of clock cycles of the local clock at the destination end, and then utilize the difference value as a feedback parameter to modify the local clock at the destination using a conventional voltage-controlled crystal oscillator (VCXO) circuit.

In most cases, the data stream is not transmitted directly from the source end to the destination end but via a transmission channel. Theoretically, the transmission channel is transparent both to the source end and the destination end, and typically has its own timing control mechanism. Not only the transmission channel operates with a different clock rate from that of the source end or the destination end, but also the transmission channel utilizes another timestamp to control timing of the data stream entering and leaving the transmission channel. The reason beneath that is due to limitation of the bandwidth of the transmission channel. Specifically speaking, the total amount of data packets allowed to be transmitted via the transmission channel at a specific moment has a maximum limit, so the data packets can be transmitted only when the bandwidth of the transmission channel is still available. In other words, the data packets have to wait if the bandwidth is fully occupied and not available at this moment. Therefore, the predetermined time interval between any two data packets may be changed after the data packets enter into the transmission channel. Some jitter will be introduced and the arriving time of the data packets at the destination end will not match the intended time indexed by the PCR values. This is exactly why the transmission channel needs its own timing control mechanism.

To eliminate the "jitter" effect, the transmission channel conventionally utilizes a timestamp and a buffer to deal with timing of the data stream. For example, if the data stream of data packets is transmitted from the source end to the destination end through an Institute of Electrical and Electronics Engineers (IEEE) 1394 serial bus, each data packet will be attached with a source packet header (SPH) containing a timestamp complying with the IEC 61883 standard. Specifically speaking, the timestamp is determined as a count number generated by a channel clock having frequency of 50 MHz of the transmission channel at the source end at the timing when the data packet corresponding to the timestamp is entering into the transmission channel. Additionally, IEC 61883 standard utilizes a first in first out (FIFO) buffer to store the data packets entering into the transmission channel. The data packet waits in the FIFO buffer and is not sent out until its timestamp indicating an intended delivery time meets the value of a channel timer at the destination end. Therefore, after the data packets leave the transmission channel and arrive at the destination end, the time interval between any two data packets can be modified to be the original value at the source end.

By this method, however, the hardware cost would be high since a large FIFO is necessary for data buffering. For example, a FIFO of 3264 bytes is typically recommended in a digital video broadcasting (DVB) system for a MPEG-2 transport stream to transmit through an IEEE 1394 serial bus. It would be beneficial to eliminate the FIFO buffer required for jitter compensation, thereby reducing the hardware cost.

SUMMARY

It is therefore an objective of the present invention to provide a timing recovery method and system to eliminate or reduce the size of the buffer required for preserving a constant delay for each data packet after leaving a transmission channel.

An embodiment of a timing recovery method comprises receiving a plurality of data packets via a transmission channel, wherein at least a data packet is attached with a timestamp generated according to a channel clock of the transmission channel at a source end; calculating a compensation value according to the timestamp and a channel timer value upon receipt of the data packet, wherein the channel timer value is generated by the channel clock of the transmission channel at a destination end; and utilizing the calculated compensation value to adjust processing timing of the received data packets. The channel timer value used for calculating the compensation value is generated by a channel timer unit at the destination end while receiving the data packet. Since, the channel timer unit at the destination end has a timing relationship with that at the source end, i.e. the two timer units should be synchronized or have certain constant difference, the intended receiving time can be calculated by the timestamp and the channel timer value at the destination end.

An embodiment of a timing recovery system comprises a processing unit, for receiving a plurality of data packets via a transmission channel, wherein at least a data packet is attached with a timestamp generated according to a channel clock of the transmission channel at a source end; a calculating unit, coupled to the processing unit, for calculating a compensation value according to the timestamp and a channel timer value upon receipt of the data packet, wherein the channel timer value is generated by the channel clock of the transmission channel at a destination end; and a timing adjusting unit, coupled to processing unit and the calculating unit, for utilizing the calculated compensation value to adjust processing timing of the received data packets.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
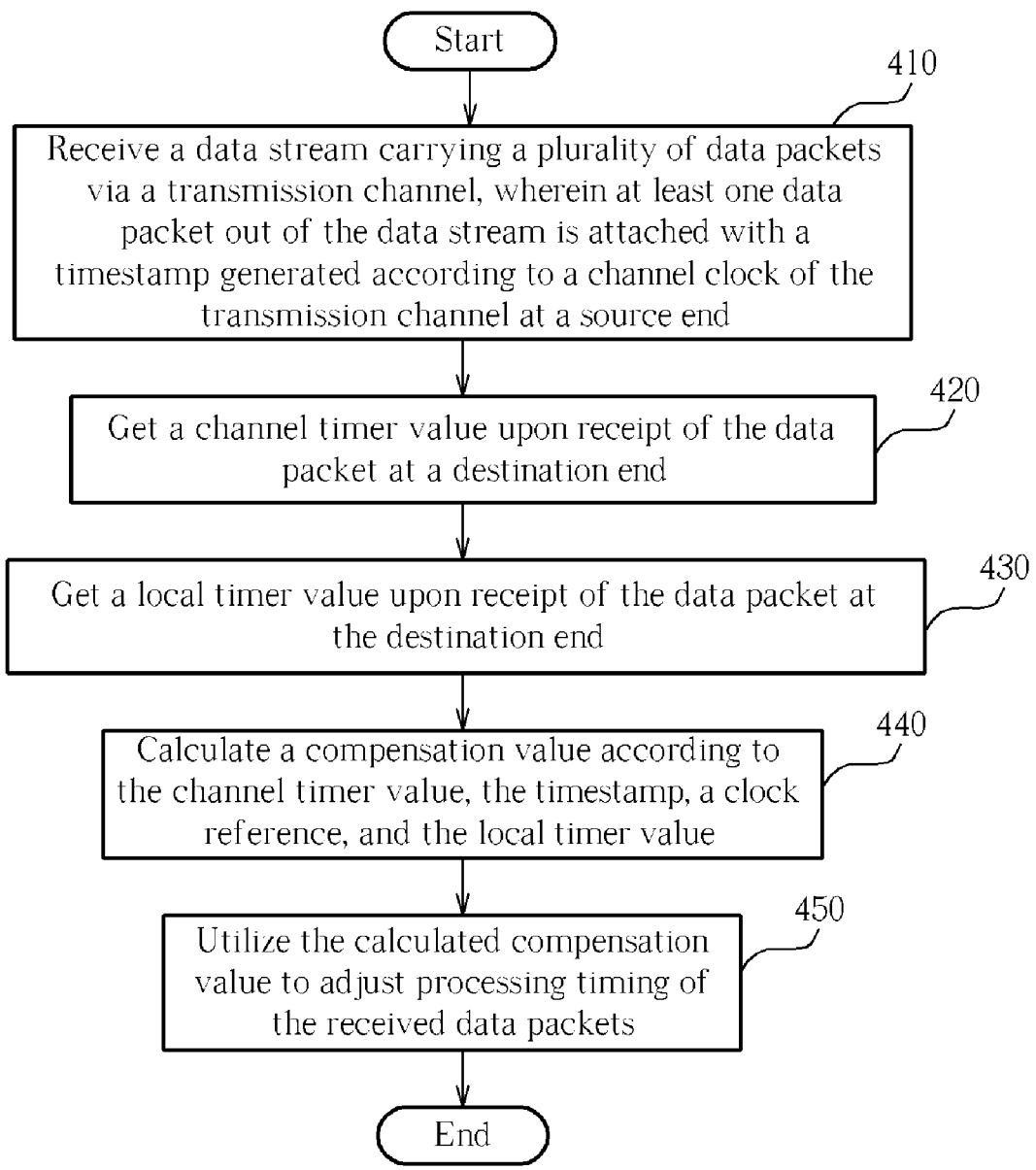
FIG. 1 is a flowchart illustrating a timing recovery method according to an embodiment of the present invention.

FIG. 1 is a flowchart illustrating a timing recovery method according to an embodiment of the present invention. As shown in FIG. 1, the method comprises the following steps:

STEP 410: Receive a data stream carrying a plurality of data packets via a transmission channel, wherein at least one data packet out of the data stream is attached with a timestamp generated according to a channel clock of the transmission channel at a source end;

STEP 420: Get a channel timer value upon receipt of the data packet at a destination end;

STEP 430: Get a local timer value upon receipt of the data packet at the destination end;

STEP 440: Calculate a compensation value according to the channel timer value, the timestamp, a clock reference, and the local timer value; and STEP 450: Utilize the calculated compensation value to adjust processing timing of the received data packets.

Figure 2:
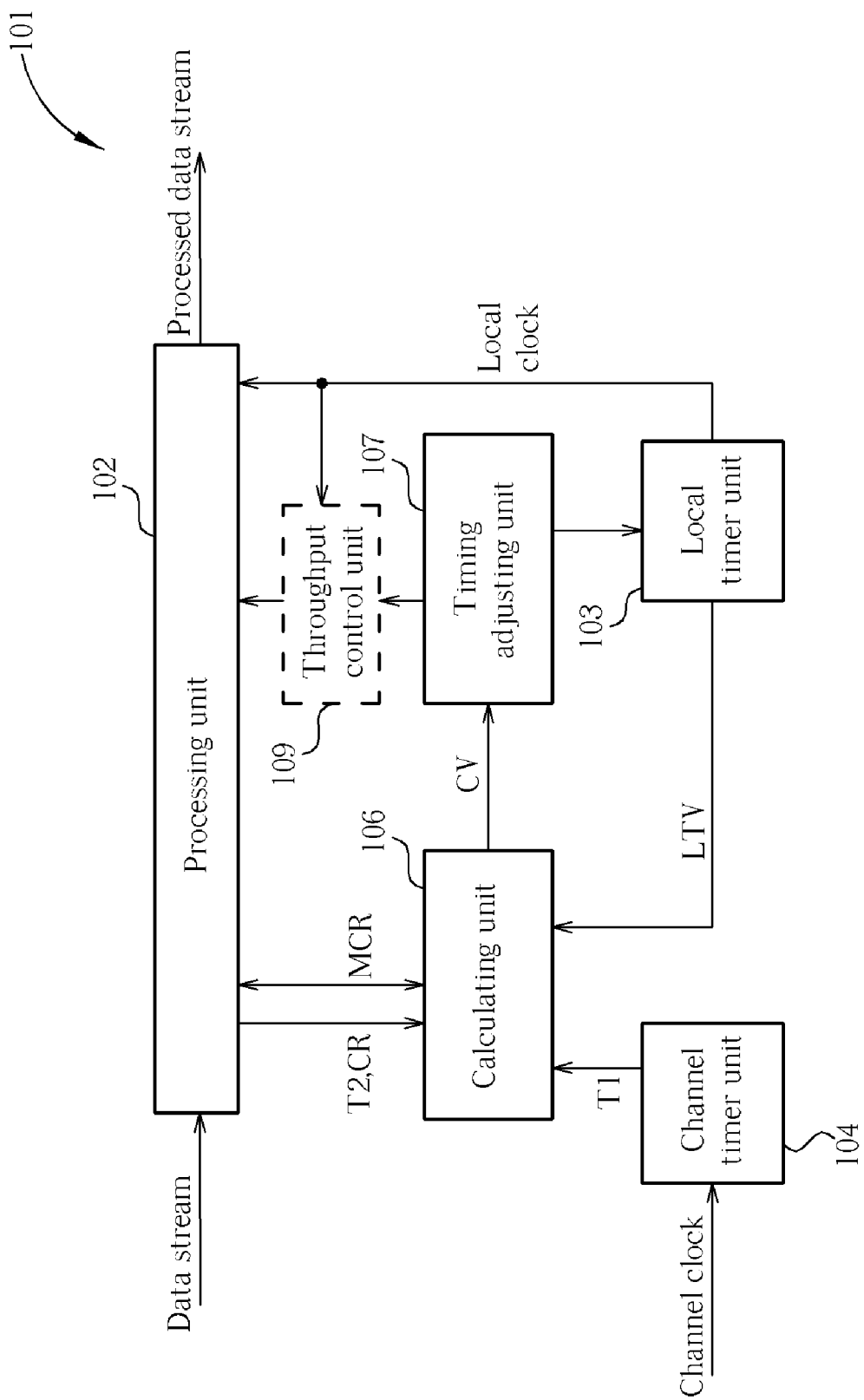
FIG. 2 is a block diagram illustrating a timing recovery system according to an embodiment of the present invention.

FIG. 2 is a block diagram illustrating a timing recovery system 101 according to an embodiment of the present invention. The timing recovery system 101 comprises a processing unit 102, a local timer unit 103, a channel timer unit 104, a calculating unit 106, and a timing adjusting unit 107. As shown in FIG. 2, the local timer unit 103 is coupled to the processing unit 102, the calculating unit 106, and the timing adjusting unit 107. The calculating unit 106 is coupled to the processing unit 102, the local timer unit 103, the channel timer unit 104, and the timing adjusting unit 107. In some embodiments, the processing unit 102, the local timer unit 103, the channel timer unit 104, the calculating unit 106, and the timing adjusting unit 107 are integrated in a system-on-chip (SOC) circuit. This is not meant to be a limitation of the present invention, however.

Please refer to FIG. 1 in conjunction with FIG. 2. The detailed description as to how the timing recovery system 101 applies the timing recovery method shown in FIG. 1 is as follows.

The processing unit 102 receives a data stream carrying a plurality of data packets via a transmission channel (not shown in drawings) to generate a processed data stream, wherein at least one data packet out of the data stream is attached with a timestamp generated according to a channel clock of the transmission channel at a source end (not shown in drawings) (STEP 410). In this embodiment, the data stream is a Moving Picture Experts Group transport stream (MPEG-TS), and the data packets are MPEG-TS packets. Some of the data packets contain a clock reference generated according to a local clock of the source end having frequency of 27 MHz at the timing when each data packet having a clock reference is being output from the source end. Furthermore, the clock reference is basically a type of timestamp recording an intended time for processing the corresponding data packet and is defined as a program clock reference (PCR) in an MPEG-2 standard. Additionally, the source end can be a digital video broadcasting (DVB) source, a digital video home system (D-VHS), or any other appropriate source. The transmission channel is an Institute of Electrical and Electronics Engineers (IEEE) 1394 serial bus complying with an IEEE 1394 standard. The timestamp is contained in a source packet header (SPH) attached to the data packet when the data packet is transmitted through the IEEE 1394 serial bus (i.e. the transmission channel). Moreover, the timestamp indicates an intended delivery time for sending the data packet out of the IEEE 1394 serial bus (i.e. the transmission channel). These standards and examples are not meant to be a limitation of the present invention, however.

Then, the channel timer unit 104 provides a timing reference to determine a channel timer value by the channel clock of the transmission channel at a destination end upon receipt of the data packet (STEP 420). Additionally, the channel timer value is provided to and referenced by the calculating unit 106. In this embodiment, the timing unit of the channel timer unit is 1/(24.576 MHz), i.e. 40.7 µs, complying with the IEEE 1394 standard. Additionally, in other embodiments, the channel timer value can be a count number, an actual time point, or any other time-related information value. The local timer unit 103 counts a local clock at the destination end to generate a local timer value while receiving the data packet (STEP 430). Additionally, the local clock can be utilized for determining processing timing of the received data packets. The frequency of the local clock is 27 MHz complying with the MPEG-2 standard. Further, the calculating unit 106 calculates a compensation value according to the channel timer value upon receipt of the data packet, the timestamp, the clock reference, and the local timer value (STEP 440). Specifically speaking, the calculating unit 106 calculates the compensation value according to the following formula:

$$CV = CR - (LTV + ((T2-T1)/P1)*P2);$$

where CV represents the compensation value, CR represents the value of the clock reference, LTV represents the local timer value, T2 represents the value of the timestamp, T1 represents the channel timer value upon receipt of the data packet, P1 represents the timing unit of the clock reference and the local timer unit 103 (i.e. 1/(27 MHz) or 37.0 μs), and P2 represents the timing unit of the channel timer unit 104 (i.e. 1/(24.576 MHz) or 40.7 μs).

Finally, the timing adjusting unit 107 utilizes the calculated compensation value to adjust the local clock generated by the local timer unit 103, thereby adjusting the processing timing of the received data packets (STEP 450). In this embodiment, the local timer unit 103 comprises a voltage-controlled crystal oscillator (VCXO) providing a fine-tunable clock, and thus the timing adjusting unit 107 utilizes the calculated compensation value as a feedback parameter fed into the local timer unit 103 to modify the local clock.

Please note that the STEP 450 can be achieved in other ways. For example, the timing recovery system 101 can optionally comprise a throughput control unit 109. As shown in FIG. 2, the throughput control unit 109 is coupled to the processing unit 102, the local timer unit 103, and the timing adjusting unit 107, for controlling an output throughput of the received data packets. In other embodiments, the timing adjusting unit 107 can utilize the calculated compensation value to adjust the output throughput generated by the throughput control unit 109, thereby adjusting the processing timing of the received data packets (STEP 405). This alternative way is especially important and useful when the local clock generated by the local timer unit 103 is inherently unchangeable.

After performing the timing recovery method of the present invention shown in FIG. 1, the processing timing of the received data packets can be recovered, so the processing unit 102 can process, such as decode, demultiplex, transmit, etc, the received data packets according to the recovered processing timing, thereby achieving clock synchronization between the source end and the destination end (i.e. the timing recovery system 101). Additionally, the processing unit 102 can be implemented by a microprocessor, a decoder, or any other appropriate circuit.

Please note that various calculation schemes and the corresponding circuitry utilized by the calculating unit 106 in the STEP 440 to calculate the compensation value are possible. Below is another example as to how the calculating unit 106 calculates the compensation value. This alternative example is not meant to be a limitation of the present invention, however.

Figure 3:
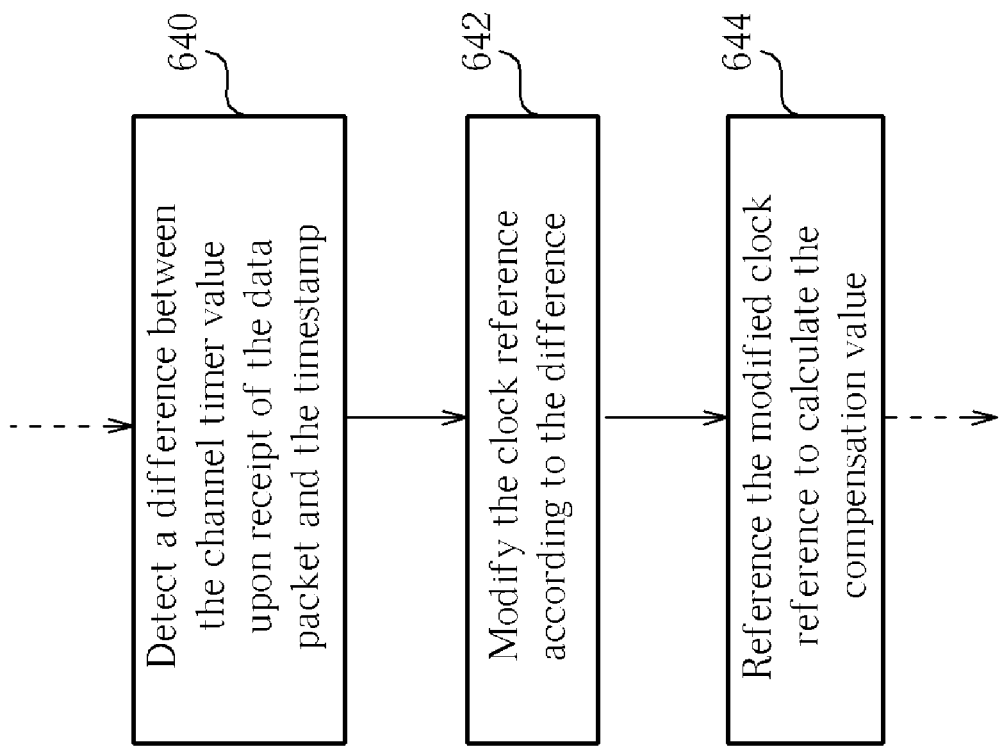
FIG. 3 is a flowchart illustrating another example of the timing recovery method in FIG. 1 applied by the calculating unit in FIG. 2, wherein the STEP 440 is replaced by the STEPs 640, 642, and 644.

FIG. 3 is a flowchart illustrating another example of the timing recovery method in FIG. 1 applied by the calculating unit 106 in FIG. 2, wherein the STEP 440 is replaced by the STEPs 640, 642, and 644. As shown in FIG. 3, the STEP 440 is replaced by the following steps:

STEP 640: Detect a difference between the channel timer value upon receipt of the data packet and the timestamp;

STEP 642: Modify the clock reference according to the difference; and

STEP 644: Reference the modified clock reference to calculate the compensation value.

In this example, the calculating unit 106 detects a difference between the channel timer value upon receipt of the data packet and the timestamp (STEP 640). Then, the calculating unit 106 modifies the clock reference in the data packet according to the difference (STEP 642). Specifically speaking, the calculating unit 106 modifies the clock reference according to the following formula:

$$MCR=CR-((T2-T1)/P1)*P2;$$

where MCR represents the value of the modified clock reference, CR represents the value of the clock reference before modification, T2 represents the value of the timestamp, T1 represents the channel timer value upon receipt of the data packet, P1 represents the timing unit of the clock reference and the local timer unit 103 (i.e. 1/(27 MHz) or 37.0 μs), and P2 represents the timing unit of the channel timer unit 104 (i.e. 1/(24.576 MHz) or 40.7 μs). Furthermore, the calculating unit 106 references the modified clock reference to calculate the compensation value (STEP 644). Specifically speaking, the calculating unit 106 calculates the compensation value according to the following formula:

$$CV=MCR-LTV;$$

where CV represents the compensation value, MCR represents the value of the modified clock reference, and LTV represents the local timer value.

Figure 4:
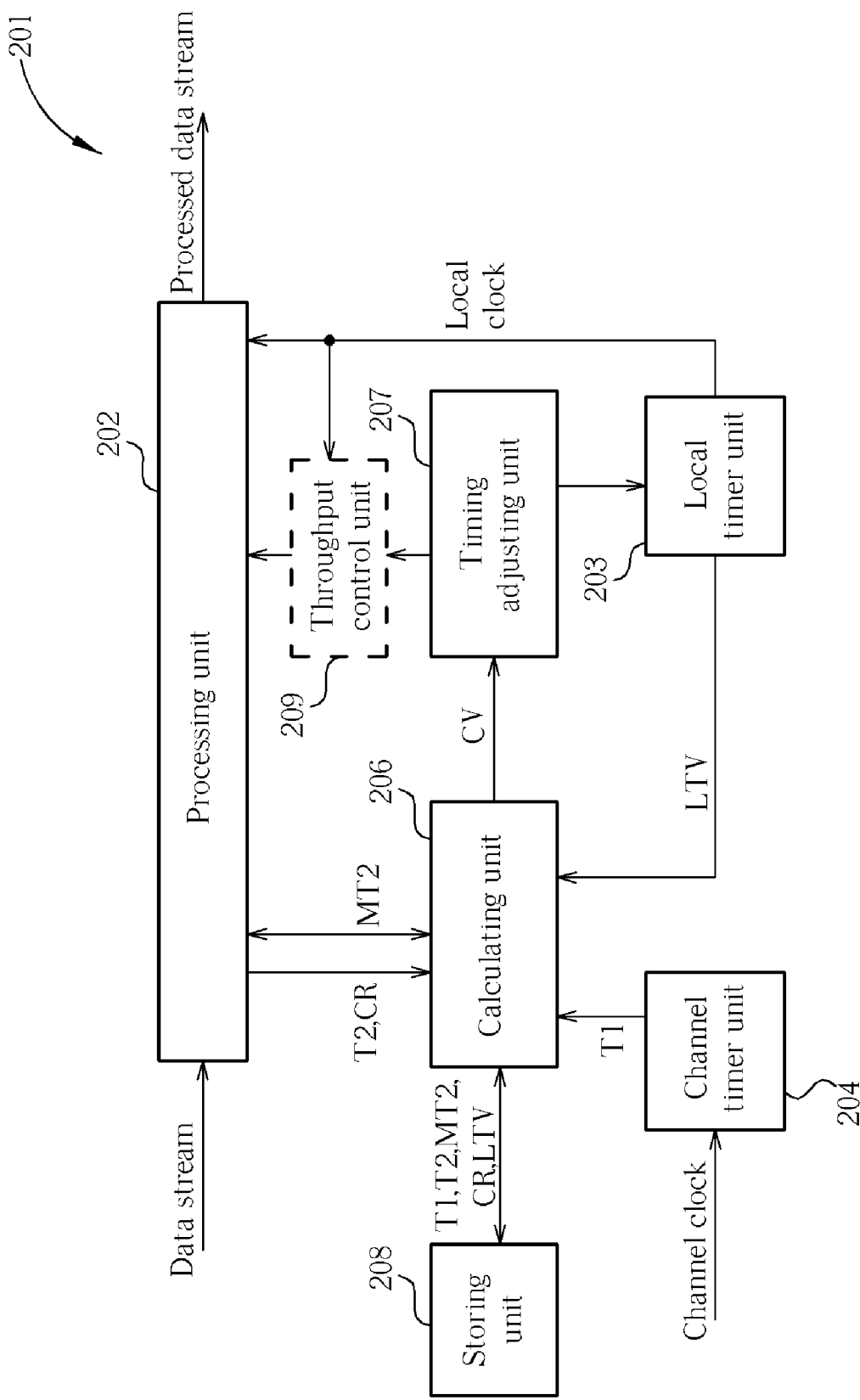
FIG. 4 is a block diagram illustrating a timing recovery system according to another embodiment of the present invention.

FIG. 4 is a block diagram illustrating a timing recovery system 201 according to another embodiment of the present invention. The timing recovery system 201 comprises a processing unit 202, a local timer unit 203, a channel timer unit 204, a calculating unit 206, a timing adjusting unit 207, and a storing unit 208. As shown in FIG. 4, the local timer unit 203 is coupled to the processing unit 202, the calculating unit 206, and the timing adjusting unit 207. The calculating unit 206 is coupled to the processing unit 202, the local timer unit 203, the channel timer unit 204, the timing adjusting unit 207, and the storing unit 208. Moreover, the timing recovery system 201 can optionally comprise a throughput control unit 209, which is coupled to the processing unit 202, the local timer unit 203, and the timing adjusting unit 207. In some embodiments, the processing unit 202, the local timer unit 203, the channel timer unit 204, the calculating unit 206, the timing adjusting unit 207, and the throughput control unit 209 (optionally) are integrated in a system-on-chip (SOC) circuit, and the storing unit 208 is an external dynamic random access memory (DRAM) coupled to the SOC circuit. This is not meant to be a limitation of the present invention, however.

The components of the timing recovery system 201 and the corresponding components of the timing recovery system 101 as described above are identical except for the calculating unit 206 and the storing unit 208, and so are the operating principles of those identical components. Additionally, the operating details of the timing recovery method shown in FIG. 1 respectively applied by the timing recovery systems 101 and 201 are the same except for the STEP 440. Therefore, the description of the identical components and the same operating details are omitted herein for simplicity.

In this embodiment, the calculating unit 206 executes the STEP 440 with the aid of the storing unit 208. Please note that the calculation scheme and the corresponding circuitry utilized by the calculating unit 206 and the storing unit 208 in the STEP 440 to calculate the compensation value can be varied. Below are some examples as to how the calculating unit 206 and the storing unit 208 cooperate to calculate the compensation value. These examples are not meant to be a limitation of the present invention, however.

Figure 5:
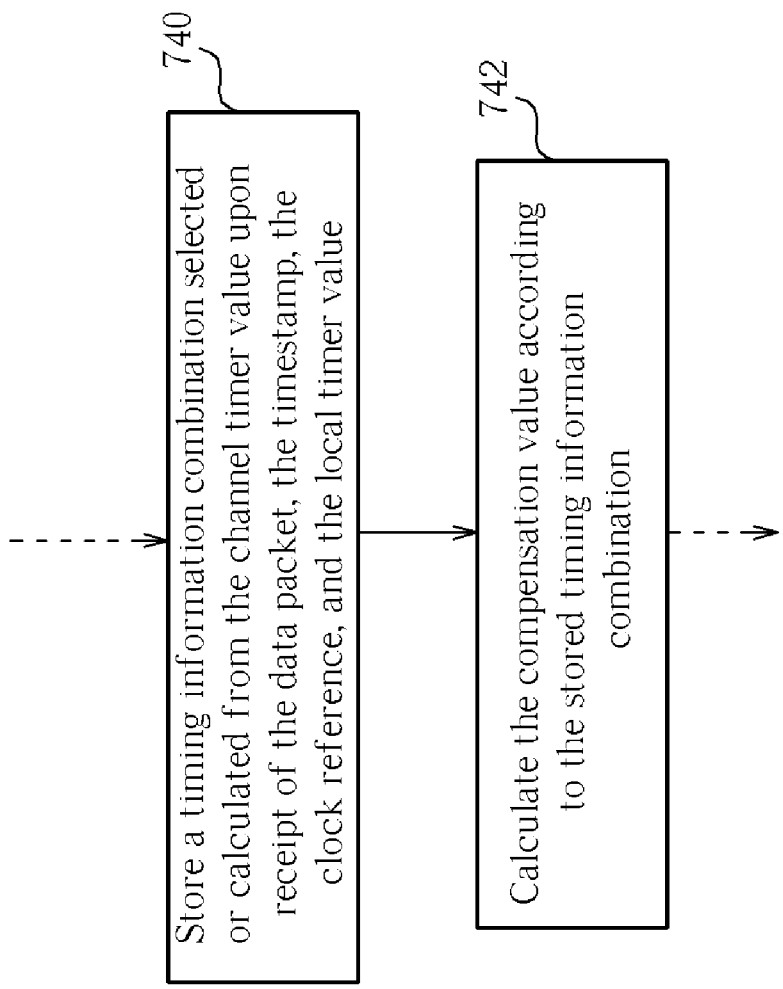
FIG. 5 is a flowchart illustrating another example of the timing recovery method in FIG. 1 applied by the calculating unit and the storing unit in FIG. 4, wherein the STEP 440 is replaced by the STEPs 740 and 742.

FIG. 5 is a flowchart illustrating another example of the timing recovery method in FIG. 1 applied by the calculating unit 206 and the storing unit 208 in FIG. 4, wherein the STEP 440 is replaced by the STEPs 740 and 742. As shown in FIG. 5, the STEP 440 is replaced by the following steps:

STEP 740: Store a timing information combination selected or calculated from the channel timer value upon receipt of the data packet, the timestamp, the clock reference, and the local timer value; and STEP 742: Calculate the compensation value according to the stored timing information combination.

In this example, the calculating unit 206 first stores a timing information combination comprising the channel timer value upon receipt of the data packet, the timestamp, the clock reference, and the local timer value into the storing unit 208 (STEP 740), and then calculates the compensation value according to the stored timing information combination (STEP 742). In other embodiments, the timing information combination can be stored in the data packet as one attribute of the data packet. Typically, the compensation value calculation is done by executing firmware, since it is usually cheaper than performing the calculation by hardware. In some embodiments, a difference between the timestamp and the channel timer value upon receipt of the data packet (T2−T1) is calculated by hardware before storage, so that the timing information combination stored in the storing unit 208 comprises the difference (T2−T1), the clock reference, and the local timer value. Please note that no matter what values the timing information combination contains, the calculating unit 206 basically and mathematically calculates the compensation value according to the following formula:

$$CV=CR-(LTV+((T2-T1)/P1)*P2);$$

where CV represents the compensation value, CR represents the value of the clock reference, LTV represents the local timer value, T2 represents the value of the timestamp, T1 represents the channel timer value upon receipt of the data packet, P1 represents the timing unit of the clock reference and the local timer unit 203 (i.e. 1/(27 MHz) or 37.0 μs), and P2 represents the timing unit of the channel timer unit 204 (i.e. 1/(24.576 MHz) or 40.7 μs).

Figure 6:
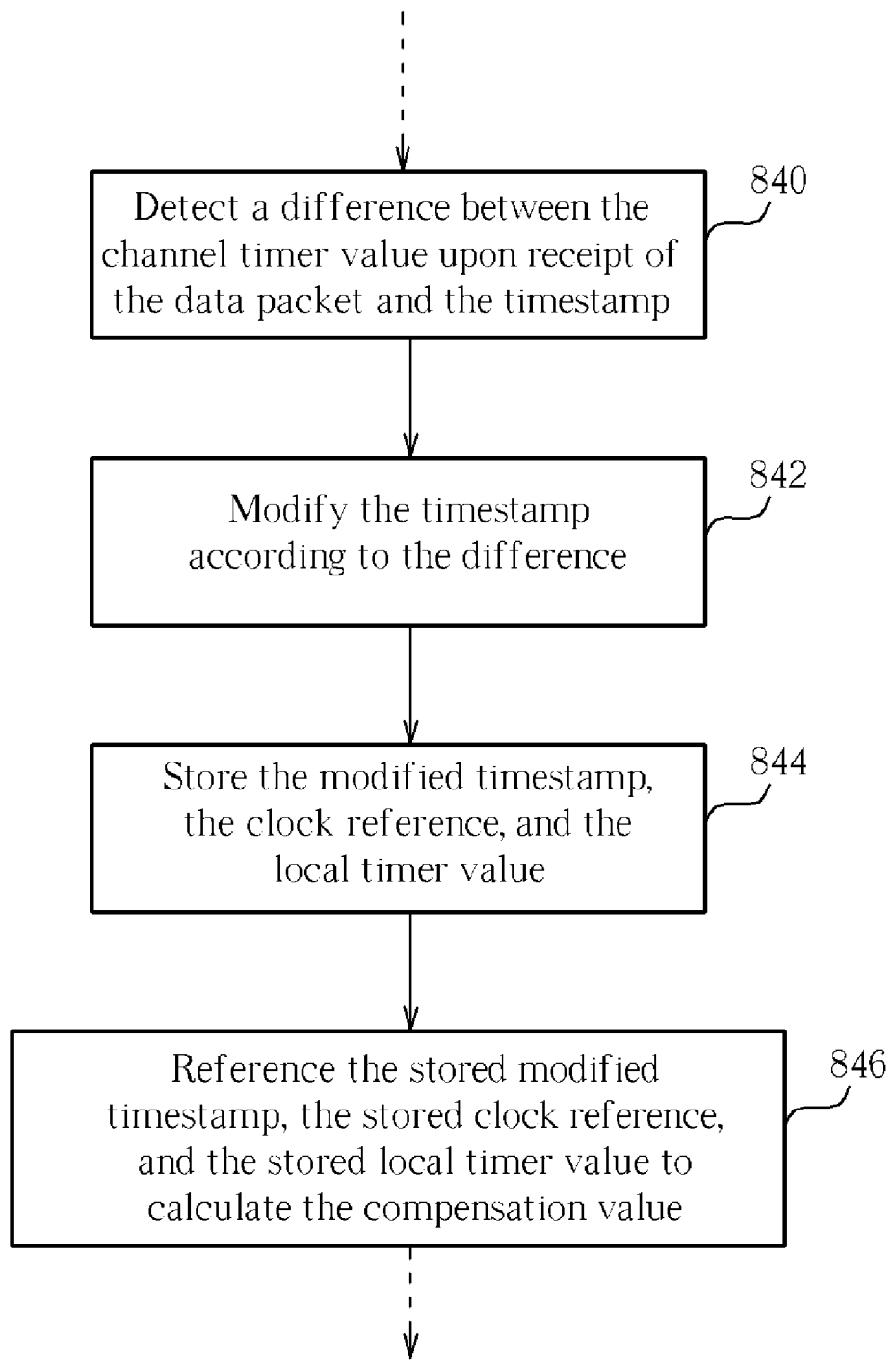
FIG. 6 is a flowchart illustrating another example of the timing recovery method in FIG. 1 applied by the calculating unit and the storing unit in FIG. 4, wherein the STEP 440 is replaced by the STEPs 840, 842, 844, and 846.

FIG. 6 is a flowchart illustrating another example of the timing recovery method in FIG. 1 applied by the calculating unit 206 and the storing unit 208 in FIG. 4, wherein the STEP 440 is replaced by the STEPs 840, 842, 844, and 846. As shown in FIG. 6, the STEP 440 is replaced by the following steps:

STEP 840: Detect a difference between the channel timer value upon receipt of the data packet and the timestamp;

STEP 842: Modify the timestamp according to the difference;

STEP 844: Store the modified timestamp, the clock reference, and the local timer value; and STEP 846: Reference the stored modified timestamp, the stored clock reference, and the stored local timer value to calculate the compensation value.

In this example, the calculating unit 206 detects a difference between the channel timer value upon receipt of the data packet and the timestamp (STEP 840). The calculating unit 206 modifies the timestamp in the data packet according to the difference (STEP 842). Specifically speaking, the calculating unit 206 modifies the timestamp according to the following formula:

$$MT2=T2-T1;$$

where MT2 represents the value of the modified timestamp, T2 represents the value of the timestamp before modification, and T1 represents the channel timer value upon receipt of the data packet. Further, the calculating unit 206 stores the modified timestamp, the clock reference, and the local timer value into the storing unit 208 (STEP 844), and then references the stored modified timestamp, the stored clock reference, and the stored local timer value in the storing unit 208 to calculate the compensation value (STEP 846). Specifically speaking, the calculating unit 206 calculates the compensation value according to the following formula:

$$CV=CR-(LTV+(MT2/P1)*P2);$$

where CV represents the compensation value, CR represents the value of the stored clock reference, LTV represents the stored local timer value, MT2 represents the value of the stored modified timestamp, P1 represents the timing unit of the clock reference and the local timer unit 203 (i.e. 1/(27 MHz) or 37.0 μs), and P2 represents the timing unit of the channel timer unit 204 (i.e. 1/(24.576 MHz) or 40.7 μs).

In the aforementioned embodiments of the present invention, when a data stream carrying data packets is transmitted from a source end to a destination end through a transmission channel (e.g., an IEEE 1394 bus), a buffer for eliminating the "jitter" effect in the transmission channel as utilized in the prior art is omitted, thereby reducing the hardware cost. Additionally, a calculating unit is utilized instead to calculate an estimated time for which a data packet has to wait in the transmission channel before being sent out. The estimated time is actually a difference between a channel timer value upon receipt of the data packet and a timestamp as described above. Further, after transferred from a frequency basis of a channel clock to that of a local clock, the estimated time can be utilized to determine a compensation value to adjust a local clock or an output throughput at the destination end, thereby adjusting the processing timing of the received data packets. Such calculation can be accomplished by hardware (e.g., the calculating unit 106 or 206 as described above) or by software (e.g., firmware stored in a storing unit) accessible to a calculating unit. These alternative designs all fall in the scope of the present invention.

Please note that although the calculating unit 206 and the storing unit 208 are two different units as shown in FIG. 4, any circuitry configuration or software scheme performing the above-mentioned formulas falls in the scope of the present invention. For example, the storing unit 208 can be integrated into the calculating unit 206 in some embodiments, thus enhancing performance and reducing design complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A timing recovery method, comprising:

receiving a plurality of data packets via a transmission channel, wherein at least a data packet containing a clock reference is attached with a timestamp generated according to a channel clock of the transmission channel at a source end;

calculating a compensation value according to the timestamp, the clock reference, a local timer value and a channel timer value upon receipt of the data packet, wherein the channel timer value is generated by the channel clock of the transmission channel at a destination end, and the local timer value is generated based on a local clock at the destination end; and utilizing the calculated compensation value to adjust processing timing of the received data packets.

2. The method of claim 1, wherein the step of utilizing the calculated compensation value comprises utilizing the calculated compensation value to adjust the local clock utilized for determining the processing timing of the received data packets at the destination end, thereby adjusting the processing timing of the received data packets.

3. The method of claim 1, wherein the step of utilizing the calculated compensation value comprises utilizing the calculated compensation value to adjust an output throughput of the received data packets, thereby adjusting the processing timing of the received data packets.

4. The method of claim 1, wherein the data packet is a Moving Picture Experts Group transport stream (MPEG-TS) packet, and the clock reference is a program clock reference (PCR) complying with a MPEG standard.

5. The method of claim 1, wherein the step of calculating the compensation value comprises calculating the compensation value according to the following formula:

$$CV=CR-(LTV+((T2-T1)/P1)*P2);$$

where CV represents the compensation value, CR represents the value of the clock reference, LTV represents the local timer value, T2 represents the value of the timestamp, T1 represents the channel timer value upon receipt of the data packet, P1 represents the timing unit of the clock reference and the local clock at the destination end, and P2 represents the timing unit of the channel timer value.

6. The method of claim 1, further comprising:
   storing a timing information combination selected or calculated from the channel timer value, the timestamp, the clock reference, and the local timer value.

7. The method of claim 6, wherein the timing information combination is stored in the data packet.

8. The method of claim 6, wherein the timing information combination comprises a difference between the timestamp and the channel timer value upon receipt of the data packet.

9. The method of claim 1, wherein the step of calculating the compensation value comprises:
   detecting a difference between the channel timer value and the timestamp; and
   referencing the difference to calculate the compensation value.

10. The method of claim 9, wherein the step of referencing the difference comprises:
    modifying the timestamp according to the difference; and
    referencing the modified timestamp to calculate the compensation value.

11. The method of claim 10, wherein the data packet contains a clock reference, and the step of referencing the modified timestamp comprises referencing the modified timestamp, the clock reference, and a local timer value generated based on a local clock at the destination end to calculate the compensation value.

12. The method of claim 11, wherein the step of referencing the modified timestamp, the clock reference, and the local timer value to calculate the compensation value comprises calculating the compensation value according to the following formula:

$$CV=CR-(LTV+(MT2/P1)*P2);$$

where CV represents the compensation value, CR represents the value of the clock reference, LTV represents the local timer value, MT2 represents the value of the modified timestamp, P1 represents the timing unit of the clock reference and the local clock at the destination end, and P2 represents the timing unit of the channel timer value.

13. The method of claim 9, wherein the data packet contains a clock reference, and the step of referencing the difference comprises:
    modifying the clock reference according to the difference; and
    referencing the modified clock reference to calculate the compensation value.

14. The method of claim 13, wherein the step of modifying the clock reference according to the difference comprises modifying the clock reference according to the following formula:

$$MCR=CR-((T2-T1)/P1)*P2;$$

where MCR represents the value of the modified clock reference, CR represents the value of the clock reference before modification, T2 represents the value of the timestamp, T1 represents the channel timer value upon receipt of the data packet, P1 represents the timing unit of the clock reference and a local clock at the destination end, and P2 represents the timing unit of the channel timer value.

15. The method of claim 13, wherein the step of referencing the modified clock reference to calculate the compensation value comprises calculating the compensation value according to the following formula:

$$CV=MCR-LTV;$$

where CV represents the compensation value, MCR represents the value of the modified clock reference, and LTV represents a local timer value generated based on a local clock at the destination end.

16. A timing recovery system, comprising:
    a processing unit, for receiving a plurality of data packets via a transmission channel, wherein at least a data packet containing a clock reference is attached with a timestamp generated according to a channel clock of the transmission channel at a source end;
    a local timer unit, coupled to the calculating unit, for generating a local timer value based on a local clock at the destination end while receiving the data packet;
    a calculating unit, coupled to the processing unit, for calculating a compensation value according to the timestamp, the clock reference, the local timer value and a channel timer value upon receipt of the data packet, wherein the channel timer value is generated by the channel clock of the transmission channel at a destination end; and
    a timing adjusting unit, coupled to processing unit and the calculating unit, for utilizing the calculated compensation value to adjust processing timing of the received data packets.

17. The system of claim 16, wherein the local timer unit is coupled to the processing unit, the calculating unit, and the timing adjusting unit, and utilized for generating the local clock at the destination end, the local clock is utilized for determining the processing timing of the received data packets, and the timing adjusting unit utilizes the calculated compensation value to adjust the local clock, thereby adjusting the processing timing of the received data packets.

18. The system of claim 16, further comprising:
    a throughput control unit, coupled to the processing unit and the timing adjusting unit, for controlling an output throughput of the received data packets;
    wherein the timing adjusting unit utilizes the calculated compensation value to adjust the output throughput of the received data packets, thereby adjusting the processing timing of the received data packets.

19. The system of claim 16, further comprising:
    a channel timer unit, coupled to the calculating unit, for generating the channel timer value upon receipt of the data packet with the timestamp.

20. The system of claim 16, wherein the data packet is a Moving Picture Experts Group transport stream (MPEG-TS) packet, and the clock reference is a program clock reference (PCR) complying with a MPEG standard.

21. The system of claim 16, wherein the calculating unit calculates the compensation value according to the following formula:

$$CV=CR-(LTV+((T2-T1)/P1)*P2);$$

where CV represents the compensation value, CR represents the value of the clock reference, LTV represents the local timer value, T2 represents the value of the timestamp, T1 represents the channel timer value upon receipt of the data packet, P1 represents the timing unit of the clock reference and the local timer unit, and P2 represents the timing unit of the channel timer value.

22. The system of claim 16, further comprising a storing unit, coupled to the calculating unit, for storing a timing information combination selected or calculated from the channel timer value, the timestamp, the clock reference, and the local timer value, wherein the calculating unit calculates the compensation value according to the stored timing information combination.

23. The system of claim 22, wherein the processing unit, the calculating unit, the local timer unit, and the timing adjusting unit are integrated in a system-on-chip (SOC) circuit, and the storing unit is an external dynamic random access memory (DRAM) coupled to the SOC circuit.

24. The system of claim 16, wherein the calculating unit detects a difference between the channel timer value and the timestamp, and references the difference to calculate the compensation value.

25. The system of claim 24, wherein the calculating unit modifies the timestamp according to the difference and references the modified timestamp to calculate the compensation value.

26. The system of claim 25, further comprising:
a local timer unit, coupled to the calculating unit, for generating a local timer value based on a local clock at the destination end while receiving the data packet;
wherein the data packet contains a clock reference, and the calculating unit references the modified timestamp, the clock reference, and the local timer value to calculate the compensation value.

27. The system of claim 26, wherein the calculating unit calculates the compensation value according to the following formula:

$$CV=CR-(LTV+(MT2/P1)*P2);$$

where CV represents the compensation value, CR represents the value of the clock reference, LTV represents the local timer value, MT2 represents the value of the modified timestamp, P1 represents the timing unit of the clock reference and the local timer unit, and P2 represents the timing unit of the channel timer value.

28. The system of claim 24, wherein the data packet contains a clock reference, and the calculating unit modifies the clock reference according to the difference and references the modified clock reference to calculate the compensation value.

29. The system of claim 28, wherein the calculating unit modifies the clock reference according to the following formula:

$$MCR=CR-((T2-T1)/P1)*P2;$$

where MCR represents the value of the modified clock reference, CR represents the value of the clock reference before modification, T2 represents the value of the timestamp, T1 represents the channel timer value upon receipt of the data packet, P1 represents the timing unit of the clock reference and the local timer unit, and P2 represents the timing unit of the channel timer value.

30. The system of claim 28, further comprising:
a local timer unit, coupled to the calculating unit, for generating a local timer value based on a local clock at the destination end while receiving the data packet;
wherein the calculating unit calculates the compensation value according to the following formula:

$$CV=MCR-LTV;$$

where CV represents the compensation value, MCR represents the value of the modified clock reference, and LTV represents the local timer value.

* * * * *